Oct. 4, 1949.                V. M. CALTHAM                2,483,807
                    ANVIL UNIT FOR RIVET SETTING MACHINES
                           Filed May 2, 1947
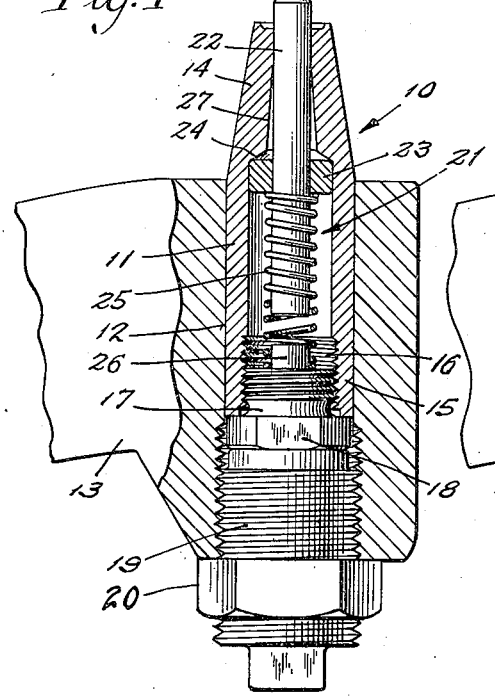
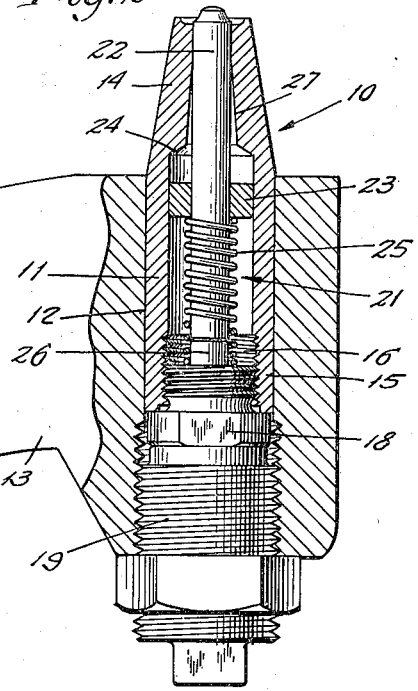
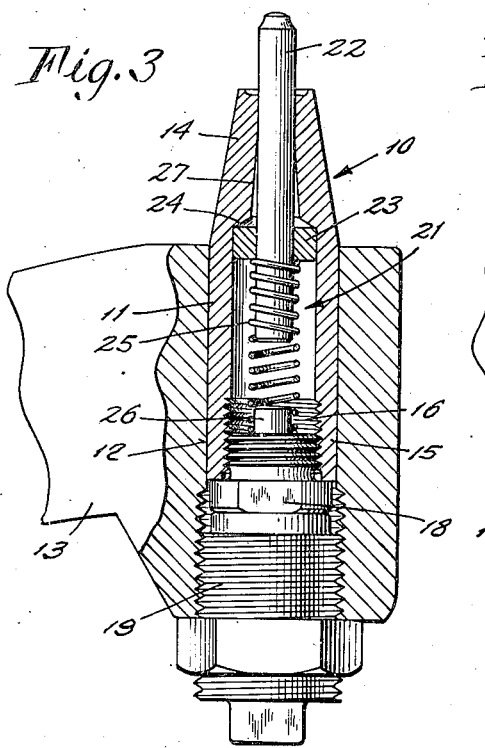
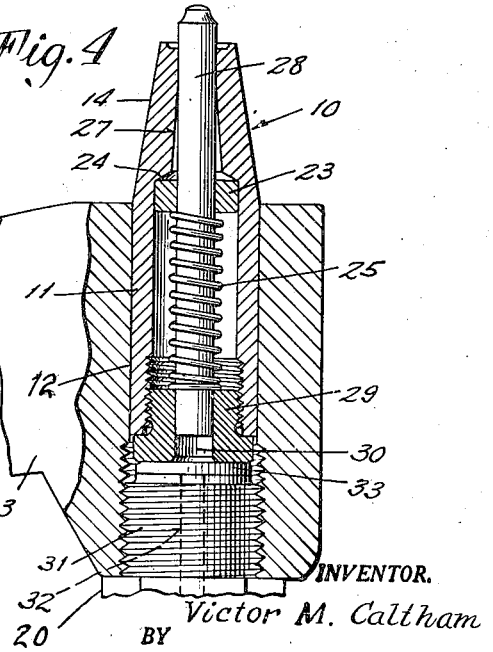
INVENTOR.
Victor M. Caltham
BY
Johnson and Kline
ATTORNEYS Patented Oct. 4, 1949

2,483,807

UNITED STATES PATENT OFFICE 2,483,807

ANVIL UNIT FOR RIVET SETTING MACHINES

Victor M. Caltham, Stratford, Conn., assignor to Milford Rivet and Machine Company, Milford, Conn., a corporation of Connecticut Application May 2, 1947, Serial No. 745,419

10 Claims. (Cl. 218—1)

This invention relates to rivet setting tools such as roll sets for use with riveting machines and the like.

The usual roll set consists of a tubular body having a spring urged plunger within it, and having one end closed by a nut against which the spring acts. Through an opening in the other end of the body a pin projects, the pin being integral with the plunger and acting as a guide over which the work to be riveted is placed. Prior to the actual riveting, the end of the pin is engaged by the end of an automatically fed hollow rivet, and then the pin recedes into the body, guiding the hollow rivet through the holes in the work. As the plunger bottoms, the end of the pin still protrudes slightly from the body, whereupon the machine operates to lay over the rivet.

In riveting, heretofore, a large number (often over five hundred) different roll sets had to be carried in stock or had to be made at one time or another as needed. This was due, in part, to the fact that different amounts of protrusion of the pin were required practically for each different job. Since the amount of protrusion was controlled by the plunger engaging an end wall of the cavity in the body, it was necessary, in order to secure a desired adjustment, to machine-off a portion of the upper or outer end of the plunger, and in order to control the amount of retraction of the pin, to machine off a portion of the lower or inner end of the plunger.

Also, in these prior roll sets, due to the pin being made integral with the plunger, certain slow and expensive operations were encountered in manufacture because, in turning down a small diameter pin, only very small cuts could be taken, and even at that, the work had a tendency to spring and become misaligned, and therefore turn out unsatisfactory. In no case could the work be done on an economical automatic screw machine, for instance.

Another difficulty was that it was not practical or economical to make the plunger to accurately fit the interior of the body, so as to give it a reliable bearing therein. Therefore, the nose of the body had to be provided with a long bearing, which required expensive reaming and lapping to fit it to the plunger pin.

According to the present invention these difficulties and disadvantages are obviated by making the pin and plunger in two separate parts instead of integral as heretofore, the pin being preferably made of special precision drill rod ground to accurate diameter, and the plunger being replaced by a movement-limiting collar or disk, the outside diameter of which can be accurately controlled so as to engage the inside of the body as a bearing. The disk has a press fit on the pin, and may therefore be located in various positions thereon, so that instead of making or carrying in stock a vast number of pin-and-plunger units providing for different amounts of protrusion of the pin, it is now merely necessary, according to the invention, to shift the movement-limiting disk to the proper position on the pin when it is assembled thereto, and this is an extremely simple operation.

Since the disk accurately fits the interior of the body, there being a clearance of about two and one half thousandths between the diameters, the disk is effective as a guide and bearing, and this obviates the necessity for having the long bearing in the nose of the body. I have found that the nose bearing now need be only from one to one and one-half diameters in length approximately, and that the rest of the nose may therefore be belled out or cleared so that only a relatively short length of the bore of the nose need be lapped to fit it to the pin, and this enables a substantial saving to be effected in machining of the bodies. Moreover, by having a relatively narrow disk rather than the longer plunger, a longer spring may be used in the body of the roll set without increasing the body length, reducing the likelihood of spring failure.

In one embodiment of the invention illustrated herein, the pin extends entirely through the nut at the rear of the body and contacts the plate or bed of the machine. This construction has the advantage that the inner or lower end of the pin is also guided where it passes through the nut, and that the setting of the retracted or backed-up position of the pin may be quickly effected by placing the body and pin carried thereby in a fixture and facing off, as by grinding, the outer face of the nut and adjacent end of the pin or plunger so that both parts are flush with each other.

In the other embodiment of the invention, the lower end of the pin does not go through the nut but engages an abutment on the nut, and for this construction the amount of retraction of the pin may be adjusted by grinding off either the end of the pin or the end of the abutment on the nut, or both.

Other features and advantages will hereinafter appear.

In the accompanying drawings:

Figure 1 is an axial section taken through a roll-set made in accordance with the invention, the pin of the set being in projected position and the set being mounted in the bed of a riveting machine which is also shown partly in section.

Fig. 2 is a view like Fig. 1 but with the pin in retracted or riveting position.

Fig. 3 is a view like Fig. 1 but showing the pin in a different projected position, projecting a greater amount than that shown in Fig. 1 and Fig. 4 is a view like Fig. 1 but showing a modification of the invention wherein the rearward end of the pin is adapted to extend through the nut in the supporting body, and is adapted to engage an adjusting screw in the machine bed.

Referring to Figs. 1 and 2, the improved roll-set shown therein comprises a tubular body 10 having a straight cylindrical barrel portion 11 adapted to be received in the cavity 12 of a riveting machine bed 13. The body 10 has a tapered nose portion 14 projecting upwardly from the bed 13 of the machine, and at its lower end 15 is provided with internal threads 16 by means of which a threaded plug 17 is secured to the body.

The plug 17 has a head 18 with flats by means of which it is tightened and loosened, the said head engaging the end of an adjustment screw 19 carried by the machine bed 13 and locked thereto by a lock-nut 20.

In accordance with the invention an improved two-part plunger and pin assembly 21 is provided, to be carried in the body 10 for vertical slidable movement, the said assembly comprising a pin 22 which is preferably formed of hardened precision drill rod having an accurately ground outside diameter and comprising a movement limiting collar or disk 23 which is press-fitted on the pin 22 and is engageable with a shoulder 24 located within the body 10 at the base of the nose portion thereof. A spiral compression spring 25 is carried by the pin 22 and engages the disk 23 and also the inner end of the plug 17, so as to normally yieldably hold the pin and plunger assembly in a protruding position as shown in Fig. 1. The disk 23 is relatively thin, that is, it has a short length compared with plungers previously used in roll-sets, and this fact, together with its extremely simple shape, enables it to be economically, accurately formed with inside and outside diameters held to close tolerances and maintained in accurate concentricity. As a result, due to the accuracy of the diameter of the pin 22 an advantageous press-fit may be provided between the pin and disk without increasing the cost of these parts beyond a practical point.

As a result of this construction the pin and plunger assembly 21 may be quickly and easily adjusted to fit various requirements of riveting, as regards the amount of protrusion of the pins from the nose 14 of the body, and therefore there is avoided the necessity for carrying on hand or making up as needed a large number of pin and plunger assemblies, as was heretofore necessary.

For example, if a riveting operation should require that the initial amount of protrusion of the pin 22 be greater than that shown in Fig. 1 this may be had by shifting the disk 23 on the pin to the position as shown on Fig. 3 wherein, when the disk 23 is engaging the shoulder 24 the pin 22 will protrude a greater amount from the nose of the body, as shown. It will thus be seen that it is possible to obtain a great number of different protruded positions of the pin 22 by merely re-positioning the collar 23 on the pin, thereby saving considerable time and expense in making up or carrying a large number of pin and collar assemblies.

For the purpose of backing up the pin 22 when the latter is in retracted position as shown in Fig. 2, an abutment or projection 26 is provided on the end of the plug 17 for engagement with the inner end of the pin 22. Where it is desired to adjust the retracted position of the pin, this may be done by grinding off a portion of the abutment 26 or of the inner end of the pin 22 or both, as the case may require.

The adjustment for the retracted position of pin 22 is of course separate from the adjustment for the protruded position of the pin as provided by shifting the disk 23 on the pin, and one adjustment normally does not affect the other.

In the construction provided above by the invention, the disk 23 may closely fit the bore of the cylindrical portion 11 of the body 10, so as to have a sliding bearing thereon, and as a result the amount of bearing provided by the pin 22 and the nose 14 of the body may be considerably reduced over that heretofore required. As shown, the bore of the nose 14 of the body 10, at the extremity of the nose, closely fits the pin 22 for a length or distance approximately equal to the diameter of the pin, and the remainder of the bore in the nose 14 may be belled out or cleared, as shown at 27. In some cases the length of the bearing portion may be approximately one and one-half times the diameter of the pin. In either case this is considerably less than that required in roll-sets which lack auxiliary bearing means such as the disk 23, since in such roll-sets it was necessary to provide a close fit of the pin 22 along the entire length of the nose 14. When it is considered that the bore has to be not only reamed but also lapped, it is seen that considerable time and expense may be involved. I have found that by the provision of the disk 23 which is closely fitted to the large bore of the cylindrical portion 11 of the body 10, it is not now necessary to provide a bearing along the entire length of the nose 14, and therefore a saving is effected as a result.

A modification of the invention is shown in Fig. 4, and in this figure parts similar to those of Figs. 1 through 3 have been given like characters. A difference between the modification of Fig. 4 and the construction of Figs. 1 through 3 resides in the length of the pin, and the structure of the screw plug threaded into the inner or lower end of the body 10. The pin 28 is normally made longer than the pin 22, and a screw plug 29 is provided which has a bore 30 extending entirely through it to slidably receive the lower end of the pin 28.

An adjusting anvil screw 31 having a bore 32 extending between its ends is threaded in the cavity 12 of the bed 13 of the machine below the pin 28 and body 11, and a hardened metal disk 33 is interposed between, on the one hand the upper end of the screw 32 and on the other hand the adjacent end surfaces of the pin 28 and plug 29. When the pin 28 is forced to its retracted position the inner or bottom end of the pin is flush with the adjacent face of the plug 29, and both pin and plug are thus backed up by the disk 33 and anvil screw 31.

Initially the pin 28 is set or adjusted in the proper retracted position by placing the body and pin assembly as shown, in a fixture which accurately positions the tip of the pin with respect to the nose 14 of the body, and by then grinding off the face of the plug 29 and the adjacent end of the pin so that these are flush with each other, and an important consideration is that this operation does not require dismantling of the assembly. The adjustment for the amount of protrusion of the pin 28 is accomplished in the manner described in connection with Figs. 1 through 3 by shifting the press-fitted disk 23 to a new location on the pin 28.

By the provision of the disk 33 and bore 32 in the screw 31, it is possible, without changing the setting of the anvil screw 31 or removing the same, to easily maintain the cavity 12 in the bed 13, clean and free from dirt and chips which have a tendency to accumulate on and adhere to the disk 33, especially when the rivet-setting tool is changed a number of times. Such dirt and foreign matter may alter the relative positions of the body 11 and pin 28 when the latter is in retracted position, sufficiently so to defeat proper rivetting.

In cleaning out the dirt and chips from the cavity 12 it is merely necessary to insert a knock-out rod in the bore 32 of the screw 31, and eject the roll set and also the disk 33 from the cavity. The disk 33 may obviously be easily cleaned when out of the cavity, and if clean it insures the end surfaces of the pin 28 and plug 29 being absolutely flush when the tool and disk are set in place in the cavity and a piece of work is being rivetted.

The bore 32 in the anvil screw 31 need not be very large, and, as shown, is preferably of smaller diameter than the pin 28.

Variations and modifications may be made within the scope of this invention and portions of the improvements may be used without others.

I claim:

1. A rivet setting tool comprising a tubular body; a round guide pin slidably carried in said body for protrusion therefrom; and adjustable means for limiting the amount of protrusion of the pin from the body, said means including a collar having a bore of slightly less diameter than the pin; affixed to the pin solely by a press fit, and located to abut a portion of the body, said collar being shiftable to different positions on the pin.

2. A rivet setting tool comprising a tubular body having bore portions of smaller and larger diameter; a round guide pin slidably carried in the body for protrusion therefrom, said pin engaging and bearing on the bore portion of smaller diameters; and adjustable means for limiting the amount of protrusion of the pin from the body, said means including a collar having a bore of slightly less diameter than the pin affixed to the pin solely by a press fit and located to abut a portion of the body, said collar having a circumference concentric with the pin and being shiftable to different positions on the pin without altering the concentricity of the circumferences of the pin and collar, said collar bearing on the bore portion of larger diameter.

3. A rivet setting tool comprising a tubular body having a cylindrical bore at one end, the length of said bore being on the order of one to one and a half times the bore diameter, and said body having a cylindrical bore of larger diameter spaced from said end; a round guide pin slidably carried in the body for protrusion therefrom, said pin bearing on the bore at the body end; and adjustable means for limiting the amount of protrusion of the pin from the body, said means including a collar having a bore of slightly less diameter than the pin affixed to the pin solely by a press fit and located to abut a portion of the body, said collar having a circumference concentric with the pin and being shiftable to different positions on the pin bearing on said bore of larger diameter.

4. A rivet setting tool comprising a tubular body; a round guide pin slidably carried in said body for protrusion therefrom; adjustable means for limiting the amount of protrusion of the pin from the body, said means including a collar having a bore of slightly less diameter than the pin affixed to the pin solely by a press fit, and located to abut a portion of the body, said collar being shiftable to different positions on the pin; and a nut on the end of the body, having a projection engageable with the end of the pin to backup the pin during retracted position thereof.

5. A rivet setting tool removable as a unit from a riveting machine, comprising a tubular body having an exterior shape to enable it to be removably seated and supported in a cavity of the riveting machine bed; a round guide pin slidably carried in said body for protrusion therefrom; adjustable means for limiting the amount of protrusion of the pin from the body, said means including a collar having a bore of slightly less diameter than the pin affixed to the pin solely by a press fit, and located to abut a portion of the body, said collar being shiftable to different positions on the pin; and a nut on the end of the body, having a bore slidably receiving the said pin for different adjusted positions of the collar, said nut providing a bearing for the pin.

6. In a riveting machine, a rivet setting tool removable as a unit from the machine, comprising a tubular body having an enterior shape to enable it to be removably seated and supported in a cavity of the riveting machine bed; a round guide pin slidably carried in the body for protrusion therefrom; adjustable means for limiting the amount of protrusion of the pin from the body, said means including a collar having a bore of slightly less diameter than the pin affixed to the pin solely by a press fit and slidably engaging the interior of the body, said collar being located to abut a portion of the body, and being shiftable to different positions on the pin without altering the concentricity of the circumferences of the pin and collar; a nut on the end of the body, having a bore slidably receiving the said pin for different adjusted positions of the collar, said nut providing a bearing for the pin; and means carried by the machine for engaging the unit and positioning it on the machine, said means backing up the nut and pin when the pin is in retracted position.

7. In a riveting machine, a bed having a recess therein; a unitary rivet-setting tool in said recess removable therefrom as a unit, comprising a tubular body; a round guide pin slidably carried in the body for protrusion therefrom; means for limiting the amount of protrusion of the pin from the body, said means including a collar having a bore of slightly less diameter than the pin affixed to the pin solely by a press fit and located to abut a portion of the body, said collar bearing on the interior of the body; a nut on the end of the body, having a bore slidably receiving the said pin for different adjusted positions of the collar, said nut providing a bearing for the pin; and means including a loose metal disk carried in the recess of the machine bed for engaging the unit and positioning it on the machine, said disk backing up the nut and pin when the pin is in retracted position, said disk being removable from the recess of the bed whereby accumulated dirt and chips adhering to the disk may be readily removed therefrom.

8. In a riveting machine, a bed having a recess therein; a unitary rivet-setting tool in said recess removable therefrom as a unit, comprising a tubular body; a round guide pin slidably carried in the body for protrusion therefrom; means for limiting the amount of protrusion of the pin from the body, said means including a collar having a bore of slightly less diameter than the pin affixed to the pin solely by a press fit and located to abut a portion of the body, said collar bearing on the interior of the body; a nut on the end of the body, having a bore slidably receiving the said pin for different adjusted positions of the collar, said nut providing a bearing for the pin; an adjusting screw threaded in the bed of the machine and extending into the said recess; and a loose metal disk in contact with said screw, for engaging the unit and positioning it on the machine, said disk backing up the nut and pin when the pin is in retracted position, said disk being removable from the recess of the bed whereby accumulated dirt and chips adhering to the disk may be readily removed therefrom.

9. In a riveting machine, a bed having a recess therein; a rivet-setting tool in said recess removable therefrom as a unit, comprising a tubular body; a round guide pin slidably carried in the body for protrusion therefrom; adjustable means for limiting the amount of protrusion of the pin from the body, said means including a collar having a bore of slightly less diameter than the pin affixed to the pin solely by a press fit and located to abut a portion of the body, said collar bearing on the interior of the body and being shiftable to different positions on the pin without altering the concentricity of the circumferences of the pin and collar; a nut on the end of the body, said nut having a bore slidably receiving the said pin for different adjusted positions of the collar, said nut providing a bearing for the pin; and an adjusting screw threaded in the bed of the machine and extending into the said recess for engaging and positioning the unit, said screw backing up the nut and pin when the pin is in retracted position, said screw having a bore of diameter smaller than the pin to receive a knock-out tool for ejecting the pin and body from the recess.

10. In a riveting machine, a bed having a recess therein; a rivet-setting tool in said recess removable therefrom as a unit, comprising a tubular body; a round guide pin slidably carried in the body for protrusion therefrom; means for limiting the amount of protrusion of the pin from the body, said means including a collar having a bore of slightly less diameter than the pin affixed to the pin solely by a press fit and located to abut a portion of the body, said collar bearing on the interior of the body; a nut on the end of the body, having a bore slidably receiving the said pin for different adjusted positions of the collar, said nut providing a bearing for the pin; an adjusting screw threaded in the bed of the machine and extending into the said recess; and a loose metal disk in contact with said screw, for engaging the unit and positioning it on the machine, said disk backing up the nut and pin when the pin is in retracted position, said screw having a bore to receive a knock-out tool for ejecting the pin, body and loose metal disk whereby accumulated dirt and chips adhered to the disk may be readily removed therefrom.

VICTOR M. CALTHAM.

REFERENCES CITED

The following references are of record in the file of this patent:

UNITED STATES PATENTS

| Number | Name | Date |
|---|---|---|
| 571,207 | Welton | Nov. 10, 1896 |
| 1,182,397 | Maenche | May 9, 1916 |
| 1,540,365 | Ross | June 2, 1925 |
| 2,179,900 | Sheane | Nov. 4, 1939 |
| 2,433,103 | Doyle | Dec. 23, 1947 |

FOREIGN PATENTS

| Number | Country | Date |
|---|---|---|
| 250,392 | Germany | Sept. 5, 1912 |